May 19, 1953     H. L. BOWDITCH ET AL     2,638,875
PNEUMATIC VALVE CONTROL VOLUME BOOSTER SYSTEM
Filed Feb. 12, 1952
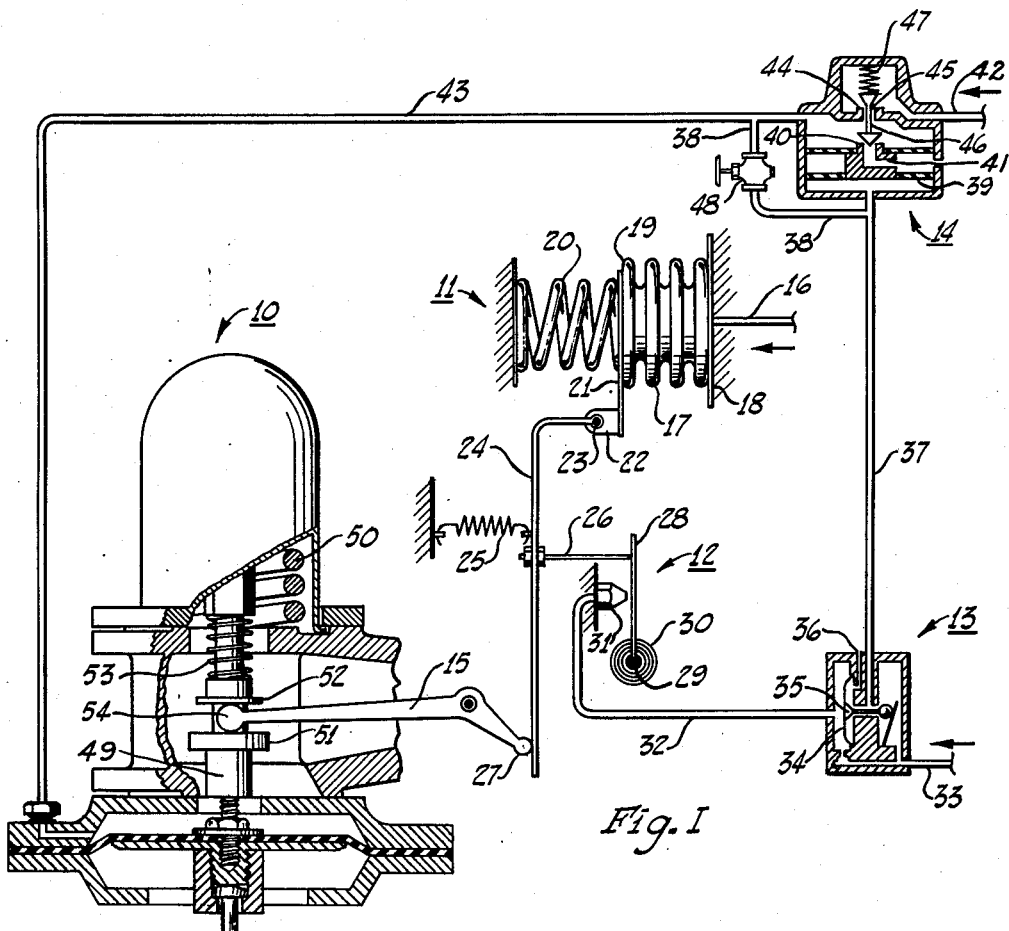
Fig. I
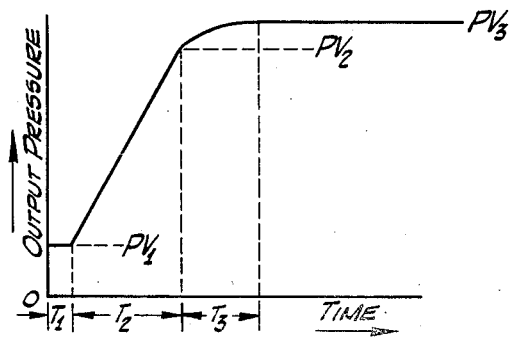
Fig. II
INVENTORS
HOEL L. BOWDITCH
ALLAN R. CATHERON
BY
Curtis, Morris + Safford
ATTORNEYS Patented May 19, 1953

2,638,875

UNITED STATES PATENT OFFICE 2,638,875

PNEUMATIC VALVE CONTROL VOLUME BOOSTER SYSTEM

Hoel L. Bowditch and Allan R. Catheron, Foxboro, Mass., assignors to Foxboro Company, Foxboro, Mass.

Application February 12, 1952, Serial No. 271,268

3 Claims. (Cl. 121—41)

This invention relates to pneumatic valve control systems and has particular reference to systems such as that shown in the Cook Patent 2,240,244 for precise positioning of valve stems, in which a feed-back action representative of the actual position of the valve stem is used as a factor in the operation of the control system.

Such systems are commonly available in small pneumatic capacity sizes for use with valves of ordinary size. This invention provides means for simply and inexpensively applying such available systems to much larger valves, demanding much greater pneumatic volume for rapid operation, than those valves for which the system was designed. The customary method of providing such large volumes quickly is to apply a standard pneumatic booster in the usual manner. This is unsatisfactory in this case because the feed-back action of the precise positioner system causes undesirable hunting or cycling in the large valve when a large volume signal from the booster in suddenly applied thereto.

This invention solves this problem by using such a system with a conventional pneumatic volume booster and a pneumatic by-pass around the booster. This by-pass is designed to present a predetermined restriction to pneumatic flow. The effect of this arrangement is that the booster action moves the valve stem rapidly through most of the desired stroke, and the by-pass action moves the valve stem less rapidly through the remainder of the desired stroke.

Variations in flow processes or pressure controlled processes are almost instantaneous and in many such processes even small variations involve large quantities of fluid. It is necessary in many processes to use large valves, and it is desirable to operate these valves rapidly, in keeping with the rapid variations in the process. Rather than attempt to design, build, and keep in stock many special systems for rapid, precise control of large valves, it is preferable to adapt thereto presently available small pneumatic capacity systems for precise control.

It is an object of this invention to provide a new and novel pneumatic valve control system.

It is a further object to provide a control system for the precise positioning of valve stems in which a small pneumatic capacity system is adapted to a large valve with large volume demand, to provide rapid and precise response therein.

Other objects and advantages of this invention will be in part obvious and in part pointed out hereinafter. The many objects and advantages of the present invention may best be appreciated by reference to the accompanying drawings, which illustrate a preferred embodiment of the present invention, and wherein:

Figure I is a schematic illustration of a pneumatic valve control system as an embodiment of this invention; and Figure II is a graph in illustration of pressure-time relations in the control system of Figure I.

Referring to Figure I, a partial showing of a valve 10 is presented. This is the valve which is operated by the control system of this invention, and an illustrative embodiment of this system is shown in connection with the valve 10. The system comprises generally a control signal receiving unit 11, a nozzle-baffle assembly 12, primarily operable by the receiving unit 11, a pneumatic relay 13 as a pneumatic pressure amplifier for the nozzle-baffle assembly, and a pneumatic volume booster unit 14 for the output of the relay 13. The stem position of the valve 10 is related back to the nozzle-baffle assembly 12 through a lever 15 as a feed-back factor in the control system and as a secondary operation of the nozzle-baffle assembly 12.

The receiving unit 11 has an input pipe 16 for leading a pneumatic control signal to the unit. The input pipe 16 is connected to a bellows 17 having a fixed end 18 to which the pipe 16 is connected, and a movable end 19. When a pneumatic signal is applied to the unit 11 through the pipe 16, the bellows 17 expands or contracts, depending upon the direction of the signal, and the bellows end 19 is moved accordingly. Engaging the movable end of the bellows and axially aligned with the bellows, a coil spring 20 is provided as a loading spring for the bellows 17, to oppose expansion and aid contraction thereof.

Secured to the movable end 19 of the bellows is a movement transmitting arm 21, which depends from the bellows and which moves laterally with the movable end of the bellows. On the lower end of the arm 21, a laterally extending and vertically disposed ear 22 is located in fixed relation to the arm 21. In this ear 22 a pivot 23 is located, on a horizontal axis which is perpendicular to the axis of the bellows 17. On the pivot 23 a depending lever 24 is mounted for pivotal movement thereabout in a vertical plane. Part way down the lever 24 a laterally extending bias spring 25 is secured to the lever to provide a tendency to clockwise movement in the lever 24. Also part way down the lever 24, a rigid pin 26 has one end fixed on the lever, and extends generally horizontally to the right thereof as a contact member for the nozzle-baffle assembly 12. The lower end of the lever 24 is unattached, but it bears upon, on its left side, an end 27 of the lever 15 previously mentioned herein as a valve stem position relating connection between the valve 10 and the nozzle-baffle assembly 12. The lever 15, with respect to the possible pivotal movement of the lever 24, opposes the clockwise biasing action of the coil spring 25.

As the arm 21 is moved laterally by the movement of the bellows 17, the lever 24 is also moved laterally, with pivoting action about the pivot 23 as a laterally moving pivot, and also with a sliding, pivoting action at the lower end of the lever 24, on the end 27 of the lever 15.

Between the signal receiving unit 11 and the nozzle-baffle assembly 12, the final step in providing transmission of movement from the bellows 17 is in the engagement of the pin 26 with a pivoted baffle 28 in the assembly 12.

The baffle 28 extends upwardly from a pivot 29, and is biased by a spring 30 about that pivot in a counterclockwise direction into engagement with the end of the pin 26. Movement of the baffle 28 about its pivot 29 is therefore accomplished when a control signal is applied to the bellows 17. In association with the baffle 28, a pneumatic bleed nozzle 31 is provided in such a manner that movement of the baffle about its pivot varies the restriction of pneumatic flow from the nozzle. The nozzle 31 is on the same side of the baffle 28 as is the pin 26 and the spring bias of the baffle 28 is therefore a bias toward the nozzle 31 as well as toward the pin 26. The nozzle 31 is connected to the pneumatic pressure amplifier 13 by means of a pipe 32 through which the nozzle is provided with a small pneumatic flow.

The pneumatic pressure amplifier 13 is a relay for supplying pneumatic power in response to a small tripping pressure supplied by back pressure through the pipe 32 as the flow through the nozzle 31 is restricted by the baffle 28. A pneumatic flow is passed through the relay 13 in restriction from a pneumatic power supply pipe 33 to supply the small flow through the nozzle 31. The nozzle back pressure is applied, in the relay, to a diaphragm 34. The relay is supplied with pneumatic pressure from the supply pipe 33, and the diaphragm 34 operates a supply and waste valve mechanism 35 to provide an output pressure from the relay 13 or to exhaust from a relay outlet 36 to atmosphere. From the output of the pressure amplifier relay a pipe 37 leads to the booster unit 14, with a pipe 38 branching off before the booster is reached. This pipe 38 is the booster unit by-pass mentioned hereinbefore.

The booster unit 14 is a volume amplifier with a 1:1 pressure relation. The booster contains a flexible diaphragm 39 on which the pressure from the relay 13 acts. The diaphragm 39 carries a valve seat 40 and a passage 41 to atmosphere. One side of the booster is connected to a supply pipe 42 and the other side is connected to an output pipe 43 which leads to the controlled valve 10. In the booster, a stationary valve seat 44 is at one end of a passage 45 connecting the supply and output of the booster. Extending through this passage is a double-ended valve 46 pushed toward the diaphragm 39 by a spring 47. This valve controls the flow of air from the supply pipe 42 to the output pipe 43 and controls the flow of air from the output pipe 43 to atmosphere, through the passage 41.

When the pressure from the relay 13 moves the booster diaphragm 39, the valve seat 40 is held against one end of the double-ended valve 46 and the other end of the valve is held clear of the stationary valve seat 44. This opens the passage 45 to allow the air to flow from the booster air supply to its output. As the pressure drop across the booster is reduced, the air through the booster is throttled and the valve seat 40 is moved away from the valve 46 to connect the booster output pipe 43 to the passage 41 to atmosphere.

The by-pass pipe 38 connects the relay output pipe 37 with the booster output pipe 43 and is provided with a valve 48, manually adjustable to establish a desired degree of restriction in the by-pass pipe 38.

The booster output pipe 43 is connected to the valve 10 so as to deliver the booster output to a pneumatic motor therein (not shown). This motor is usually of the diaphragm type, with a valve stem 49 attached thereto. For convenience, in this valve the arrangement is that an increase in pressure will move the valve stem 49 downward. In opposition to the downward movement of the stem is a large coil spring 50 which is concentrically mounted around the stem 49 and is arranged in the usual manner to move the stem upward when the pressure in the pneumatic motor is reduced. Mounted on the stem 49 is a fixed collar 51 and a movable collar 52, urged toward the fixed collar 51 by a spring 53. Between these collars a rounded end 54 of the lever 15 is thus resiliently held. Under normal operating force conditions, the lever end 54 is held at one point, vertically, on the valve stem 49. The lever end 54 thus moves vertically with the stem with a small horizontal component as the lever 15 is moved about a pivot 55. In this manner the lever 15 carries a valve stem position indication to the lever 24 as a factor in the control of the valve.

In the operation of this control system and with reference to Figure II, and the time-pressure relations of the control system, the pressure values shown are all taken at the valve 10, that is the pressure in the pneumatic motor of the valve 10. These pressures are designated PV (pressure at the valve). $PV_1$ represents the pressure in the valve motor at the time a control signal is applied to the bellows 17. Also, zero time is the time at which the control signal is applied to the bellows. $T_1$ represents the time between the application of a control signal to the bellows 17 and the first application of responsive pressure to the valve motor. $T_2$ represents the time the booster is in operation and the valve stem is being moved rapidly. $PV_2$ represents the point at which the booster pressure drop is so small that the booster is closed. $T_3$ is the time necessary to move the valve stem, less rapidly, to its final position, with the by-pass 38 as the only conduit of added pressure to the valve 10. $PV_3$ is the final output pressure with the valve stem 49 in its precisely correct position and the system balanced and at rest.

It should be noted here that the booster may be considered to operate either as a fully throttling valve or as an on-off valve, with or without partial throttling. These differences lie in the pressure-volume relations which may be built into the booster and this invention is not concerned with the details of such arrangements. They simply vary the slope or contour of the time-pressure curve as in Figure II, particularly in the area covered by $T_2$. With the booster arranged as a fully throttling device it would be expected that a straight line relation would be obtained, as is shown in the drawing. The main concern of this invention is to provide a booster arrangement which will change $PV_1$ to $PV_2$ rapidly and $PV_2$ to $PV_3$ at a slower rate.

When a positive (increased pressure) signal is received in the bellows 17, the bellows is expanded, and the arm 21 is moved to the left along with the movable end 19 of the bellows. The pivoted lever 24 is moved to the left, turning on its pivots at 23 and 27 with the result that the pin 26 is moved away from the baffle 28. Until the valve stem 49 is moved, the pivot at 27 remains unmoved. The baffle spring 30 causes the baffle to follow the pin 26 but this action restricts the pneumatic flow from the nozzle 31. Back pressure from the nozzle 31 operates the pressure amplifier relay 13 and an output signal therefrom is impressed in the pipe 37. Since the volumes of the pipes 37 and 38 and of the signal receiving chamber in the booster unit are small, for practical purposes the full output pressure of the relay 13 reaches the booster and the restrictor 48 simultaneously.

The booster now acts quickly to supply greater volume of air at the same pressure, and impresses this volume in the pipe 43 leading to the valve. But there is a small delay because of the time necessary to operate the booster and to fill the pipe 43 and the pneumatic motor of the valve 10 with air at full pressure. This means that there is a pressure drop between pipe 37 and pipe 43, that is, between the ends of the by-pass pipe 38. This may be called the booster pressure drop. At this point, pressure is applied to the valve 10 and movement of the valve stem 49 is started. Because of the large volume output of the booster unit, the valve stem under these conditions is moved rapidly through most of the stroke called for by the control signal. As the valve stem is thus being rapidly moved, the pressure drop across the booster is being rapidly reduced.

When the booster pressure drop is reduced to the value which is the pressure threshold of operation for the booster, the booster no longer operates. From this point, the further movement of the valve stem becomes slower, since the relay 13 is then in control as actuated in part by the feed-back action of the arm 15 and as operating through the small capacity by-pass 38. This slower movement continues until the valve stem actually reaches the position precisely representative of the value of the signal which has been applied to the bellows 17. This is the precise positioner action in which the relation of the baffle 28 to the nozzle 31 is a function of the combined movements of the bellows 17 and the valve stem 49.

The by-pass restrictor 48 may be adjusted for greater or less restriction as a means of changing the slope of the T₃ or by-pass portion of the curve in Figure II. If the restrictor 48 is opened too far, the booster pressure may not reach the threshold of pressure needed for its operation, although the capacity of the by-pass pipe would have to be substantial for this condition. If the restriction passage in the restrictor 48 is too small, the action will be the same as if there were no by-pass, and the undesirable hunting or cycling of the valve stem will occur.

The booster and by-pass action is the same, except in reverse, when the signal applied to the bellows 17 constitutes a reduction in pressure.

This invention, therefore, provides a pneumatic valve control system with feed-back action from the valve stem, in which a volume booster is used without ill effect because a small capacity booster by-pass is provided.

We claim:

1. In a pneumatic control system for positioning a valve stem in accordance with a pneumatic control signal, a pneumatic motor for receiving a pneumatic representation of said signal and for actuating said stem in response thereto, and an arrangement for receiving said signal, producing said representation, and applying said representation to said motor; said arrangement including a member movable with said valve stem in representation of the actual movement of said stem, a pneumatic nozzle-baffle assembly operable jointly by said signal and said member, a pneumatic volume booster unit operable through the action of said nozzle-baffle assembly, a first pneumatic transmission pipe operatively connecting said assembly with said booster unit, a second pneumatic transmission pipe operatively connecting said booster unit with said pneumatic motor, and a small capacity pipe of predetermined restriction to pneumatic flow connecting said first and second transmission pipes as a by-pass with respect to said booster unit.

2. In a pneumatic control system for positioning a valve stem in accordance with a pneumatic control signal, a pneumatic motor for receiving a pneumatic representation of said signal and for actuating said stem in response thereto, and an arrangement for receiving said signal, producing said representation, and applying said representation to said motor; said arrangement including a bellows for initially receiving said signal, a member movable with said valve stem in representation of the actual movement of said stem, a pneumatic nozzle-baffle assembly operable jointly by said bellows and said member, a pneumatic relay operable through the action of said nozzle-baffle assembly, a pneumatic volume booster unit for receiving the output of said relay, a first pneumatic transmission pipe operatively connecting said relay with said booster unit, a second pneumatic transmission pipe operatively connecting said booster unit with said pneumatic motor, and a small capacity pipe of predetermined restriction to pneumatic flow connecting said first and second transmission pipes as a by-pass with respect to said booster unit.

3. In a pneumatic control system for positioning a valve stem in accordance with a pneumatic control signal, a pneumatic motor for receiving a pneumatic representation of said signal and for actuating said stem in response thereto, and an arrangement for receiving said signal, producing said representation, and applying said representation to said motor; said arrangement including a bellows for initially receiving said signal, a member movable with said valve stem in representation of the actual movement of said stem, a pneumatic nozzle-baffle assembly operable jointly by said bellows and said member, a pneumatic relay operable through the action of said nozzle-baffle assembly, a pneumatic volume booster unit for receiving the output of said relay, a first pneumatic transmission pipe operably connecting said relay with said booster unit, a second pneumatic transmission pipe operatively connecting said booster unit with said pneumatic motor, a small capacity pipe connecting said first and second transmission pipes as a by-pass with respect to said booster unit, and an adjustable restriction in said by-pass.

HOEL L. BOWDITCH.
ALLAN R. CATHERON.

References Cited in the file of this patent

UNITED STATES PATENTS

| Number | Name | Date |
| --- | --- | --- |
| 2,240,244 | Cook | Apr. 29, 1941 |
| 2,388,457 | Ziegler | Nov. 6, 1945 |